United States Patent [19]

McKinley

[11] 3,854,038
[45] Dec. 10, 1974

[54] METHOD AND APPARATUS FOR COMPENSATING FLUID FLOW FOR A VARIABLE PHYSICAL CONDITION

[75] Inventor: Ronnie Jack McKinley, Longview, Tex.

[73] Assignee: Halliburton Company, Duncan, Okla.

[22] Filed: Aug. 27, 1973

[21] Appl. No.: 391,770

[52] U.S. Cl. ............ 235/151.34, 235/92 FI, 73/194
[51] Int. Cl. ..................... G01f 1/08, G01f 15/02
[58] Field of Search ......... 235/151.34, 92 FI, 151.3; 73/194 EM, 229, 61.1

[56] References Cited
UNITED STATES PATENTS

| | | | |
|---|---|---|---|
| 3,614,892 | 10/1971 | Ottenstein................ | 235/151.34 X |
| 3,699,320 | 10/1972 | Zimmerman et al. ......... | 235/151.34 |
| 3,700,865 | 10/1972 | Ley........................... | 235/151.34 X |
| 3,729,995 | 5/1973 | Kovacs et al. ............. | 235/151.34 X |
| 3,772,915 | 11/1973 | Stamler..................... | 235/151.34 X |

Primary Examiner—Malcolm A. Morrison
Assistant Examiner—Edward J. Wise
Attorney, Agent, or Firm—Burns, Doane, Swecker & Mathis

[57] ABSTRACT

A method and system for compensating a manifestation of fluid flow for a variable physical condition of the fluid in which pulses from a condition response transducer and from a fixed frequency oscillator are algebraically combined to control the duration of a gating impulse initiated responsively to fluid flow. The gating impulse is utilized to pass pulses from the oscillator as packets of pulses in which the number of packets is related to fluid flow and in which the number of pulses in each packet is related to the variable physical condition of the fluid.

28 Claims, 3 Drawing Figures

METHOD AND APPARATUS FOR COMPENSATING FLUID FLOW FOR A VARIABLE PHYSICAL CONDITION

BACKGROUND OF THE INVENTION

This invention relates to fluid flow measuring systems and more particularly to a method and apparatus for compensating fluid flowmeters for variable physical conditions of the fluid.

The need to compensate fluid flowmeters for variable physical conditions of the fluid, such as constituency, density, pressure, temperature and the like, has been recognized and numerous methods and techniques have been used for various applications. Among these methods have been mechanical, electro-mechanical and electrical systems for integrating the output of the flowmeter and the output of a condition responsive transducer to yield a manifestation of fluid flow compensated for the variable condition of the fluid. These systems do not, however, provide the extremely high resolution necessary for metering variable fluids such as an oil/water emulsion in which the water content may vary by only about 3 percent of the total volume. In such applications, it may be necessary to resolve a volume of oil to the nearest 0.1 percent of the total liquid volume of the emulsion and to minimize the volumetric effects of temperature variations and the nonlinearities of the condition responsive transducer.

As illustrated by U.S. Pat. Nos. 3,566,685 and 3,605,497 issued to Carl W. Zimmerman et al., respectively on Mar. 2, 1971, and Sept. 20, 1971, one known system subtracts the pulses in a gross fluid flow related digital signal from packets of pulses gated from a condition responsive transducer in response to each flow related pulse to provide an output signal. The number of pulse packets is thus related to fluid flow and the number of pulses in each packet is related to the variable physical condition of the fluid. The summation of the pulses in the output signal thus provides a manifestation of fluid flow compensated for the variable physical condition of the fluid.

Rather than utilizing a fixed gate width enabling pulse to pass a variable frequency condition responsive signal, the condition responsive transducer is utilized in other embodiments to control the width of the gate enabling signal, and the pulses passed by the gate may be a constant frequency. The number of pulses in the packets passed by the gate thus remains related to the condition for which compensation is desired irrespective of the selection of the variable factor, i.e., pulse width or frequency of pulses applied to the gate.

In the variable pulse width embodiments, it has been found desirable to utilize a variable pulse width multivibrator to enable the gate. In the Zimmerman et al system, the variable gate width is generally obtained by the provision of a minimum gate width portion and the addition of a relatively short time duration variable portion. There are, however, multivibrators which will provide a pulse variable in width from zero to a predetermined maximum in response to a control pulse likewise variable from zero to a predetermined maximum. One such multivibrator is disclosed and claimed in my copending application Ser. No. 360,577 filed May 15, 1973, for "Precision Voltage Control Monostable Multivibrator" and assigned to the assignee hereof. The disclosure of said application Ser. No. 360,577 is hereby incorporated herein by reference.

The utilization of a multivibrator of this type requires the generation of a zero to predetermined maximum control signal responsive to the condition responsive transducer. It is accordingly an object of the present invention to provide a novel method and apparatus for providing a control signal variable from zero to a predetermined maximum.

It is another object of the present invention to provide a novel method and system for compensating a manifestation of fluid flow for a variable physical condition of the fluid.

Yet another object of the present invention is to provide a novel method and system for manifesting gross fluid, net oil and net water in an oil/water emulsion.

A further object of the present invention is to provide a novel method and fluid flow compensating system which is simple in design and inexpensvie in cost while retaining extremely high resolution.

yet a further object of the present invention is to provide a novel method and pulse duration control circuit selectively linearized for one of a predetermined family of frequency response curves.

These and other objects of the present invention will become apparent to one skilled in the art to which the invention pertains from a perusal of the following detailed description when read in conjunction with the appended drawings.

DETAILED DESCRIPTION

The present invention has a particular utility in producing oil wells in compensating fluid flow manifestations for fluctuations in the water cut or oil/water ratio, temperature and the like and will, for convenience, be hereinafter described in that environment.

Figure 1:
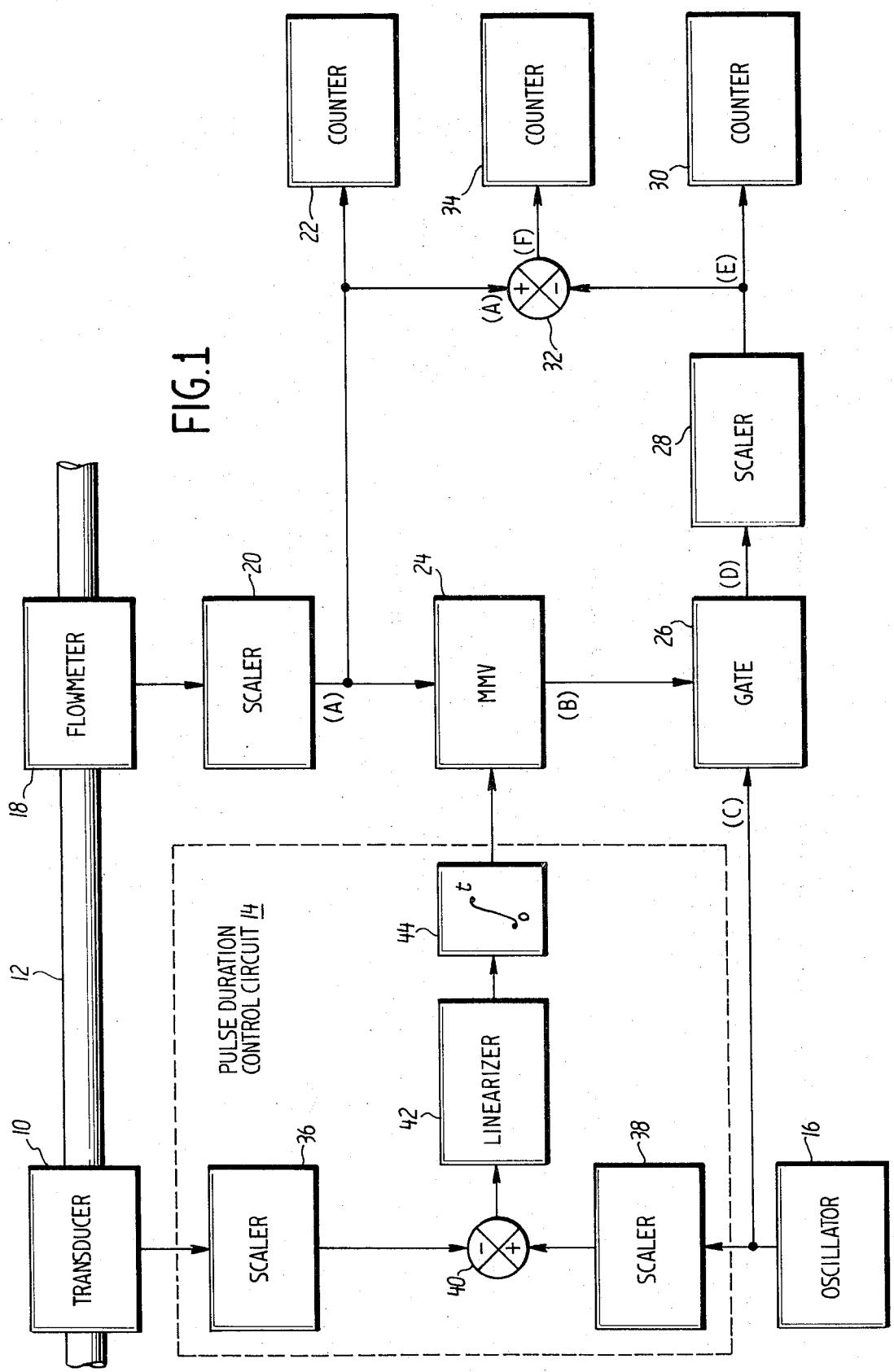
FIG. 1 is a schematic block diagram of the system of the present invention.

With reference to FIG. 1, the system may include a condition responsive transducer 10 disposed in a conduit 12. The transducer 10 may be a capacitance probe oscillator of the type conventionally used in a net oil analyzer and may comprise a Clapp oscillator circuit having a variable capacitor in the electrical tank circuit thereof and physically located in the conduit which determines the frequency of the oscillator circuit. By way of example, the transducer may be of the type claimed in U.S. Pat. No. 3,253,245 issued Aug. 4, 1970, to Love et al., and assigned to the assignee of the present invention.

The frequency of the oscillator may thus vary as a function of the dielectric constant of the fluid between the plates of the capacitance. As the dielectric constant for oil (about 2.5) is significantly less than that of water (about 80), the frequency of the output signal of the oscillator may be related to the oil/water ratio of the fluid in the conduit.

The output signal from the transducer 10 may thus have a pulse repetition rate inversely related to the percentage of water in the fluid carried by the conduit 12. This signal may be applied to a pulse duration control circuit 14 which also receives a fixed pulse repetition rate signal from a suitable conventional oscillator 16.

Also disposed in the conduit 12 is a flowmeter 18 which may be of any suitable type such as the turbine mass flowmeter disclosed in U.S. Pat. No. 3,164,020 to Edward Groner et al., and assigned to the assignee of the present invention. Alternatively, a suitable positive displacement meter may be employed.

The output signal from the flowmeter 18 may be a series of pulses which may be applied through a conventional shaping and/or scaler circuit 20 to correct the frequency of the output signal from the flowmeter 18 for internal friction and to register in the proper units when applied to a suitable conventional gross fluid counter 22.

The shaped and scaled output signal from the flowmeter 18 may also be applied to a variable pulse width multivibrator 24 which also receives the output signal from the pulse duration control circuit 14. When the variable pulse width multivibrator 24 is triggered by a pulse from the scaler 20, a gating pulse may be generated having a width or duration related to the amplitude of the output signal from the pulse duration control circuit 14. By way of example, the variable pulse width multivibrator 24 may be of the type described and claimed in the aforesaid U.S. Pat. application Ser. No. 360,577.

The gating pulse from the multivibrator 24 may be applied to the control input terminal gate 26 to enable the gate for the duration thereof. The gate 26 may be connected to pass, when enabled, the fixed frequency output signal from the oscillator 16 through a scaler 28 to a suitable conventional counter 30.

The output signal from the scaler 20 may also be applied to the positive input terminal of a suitable conventional subtractor circuit 32 and the output signal from the scaler 26 may be applied to the negative input terminal of the subtractor circuit 32. The output signal from the subtractor circuit 32 may be applied to a suitable conventional counter 34.

In operation, the output signal from the flowmeter 18 is appropriately scaled in the scaler 20 to adjust for the meter factor of the flowmeter 18. This flow related output signal from the flowmeter 18 may be of the type illustrated in FIG. 2 as waveform (A) and may be directly applied to the counter 22 to manifest the total volume of fluid flowing through the conduit 12.

The flow related output signal (A) from the scaler 20 may also be utilized to trigger the monostable multivibrator 24 to the unstable state thereof and to thereby enable the gate 26 to pass the constant frequency output signal from the oscillator 16 through the scaler 28 to the counter 30 as a manifestation of the total volume of water flowing through the conduit 12. While the gate 26 is enabled in response to each of the flow related pulses in FIG. 2(A), the duration of the unstable state of the multivibrator 24 may vary substantially as indicated in waveform (B) of FIG. 2 to thereby vary the period in which the gate 26 is enabled to pass as waveform (D) the portions of the output signal illustrated in FIG. 2 as waveform (C) which occur simultaneously with the individual pulses in FIG. 2(B).

Figure 2:
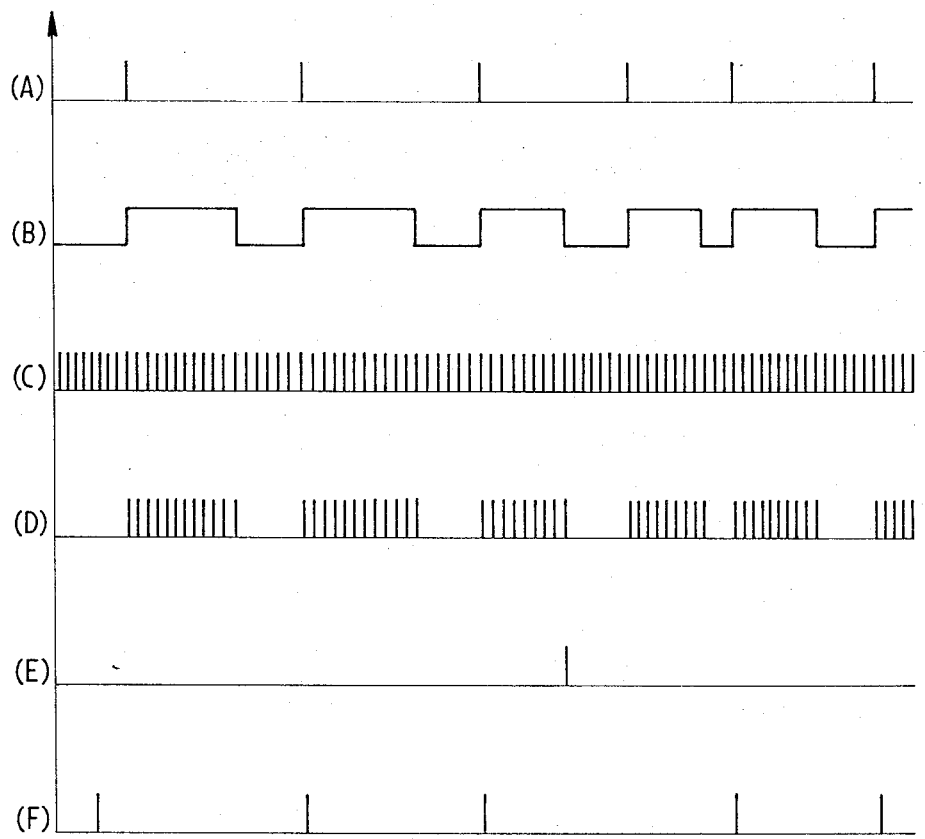
FIG. 2 is a timing diagram illustrating the waveforms appearing at the indicated points in the system of FIG. 1; and, FIG. 3 is a graph illustrating a family of response curves for different API gravities.

The variations in the width of the individual pulses of waveform (B) of FIG. 2 are adjusted as a function of the variable physical condition sensed by the transducer 10 through the operation of the pulse duration control circuit 14 hereinafter described in greater detail.

The gross fluid flow related signal of FIG. 2(A) is also applied to the subtractor circuit 32 which functions to subtract therefrom the net water signal illustrated in FIG. 2 was waveform (E) and to thereby provide the net oil signal illustrated in FIG. 2(F). The pulse in waveform (F) may be applied to the counter 34 where the total oil flowing through the conduit 12 may be manifested.

With continued reference to FIG. 1, the pulse duration control circuit 14 receives the output signal from the condition responsive transducer 10 as well as the output signal from the constant frequency oscillator 16. These output signals are scaled respectively in suitable conventional scalers 36 and 38 and applied respectively to the negative and positive input terminals of a suitable conventional subtractor circuit 40. The output signal from the subtractor circuit 40 may be applied to a suitable conventional linearizer circuit 42 and the output signal therefrom integrated in a suitable conventional integrator 44 to provide a d.c. signal to the monostable multivibrator 24 to vary the duration of the unstable condition thereof.

In operation, the frequency response of the transducer 10 and the frequency of the output signal of the oscillator 16 are adjusted by the scalers 36 and 38 such that the difference therebetween, i.e., the output signal from the subtractor circuit 40, is zero in the absence of water in the conduit 12. The linearizer 42 is generally required due to the non-linear relationship of the frequency of the output signal from the transducer 10 with respect to the oil/water ratio. The nonlinearity may be introduced, at least in part, due to the insulating coating on the probe and the characteristic nonlinear relationship between water cut and the dielectric constant of oil/water mixture as a result of the substantially different dielectric constants of oil and water.

The linearizer 42 may be of the type claimed in U.S. Pat. No. 3,550,019 issued to J. E. Thomas on Dec. 22, 1970, assigned to the assignee of the present invention. The disclosure of said U.S. Pat. No. 3,550,019 is hereby incorporated herein by reference.

Figure 3:
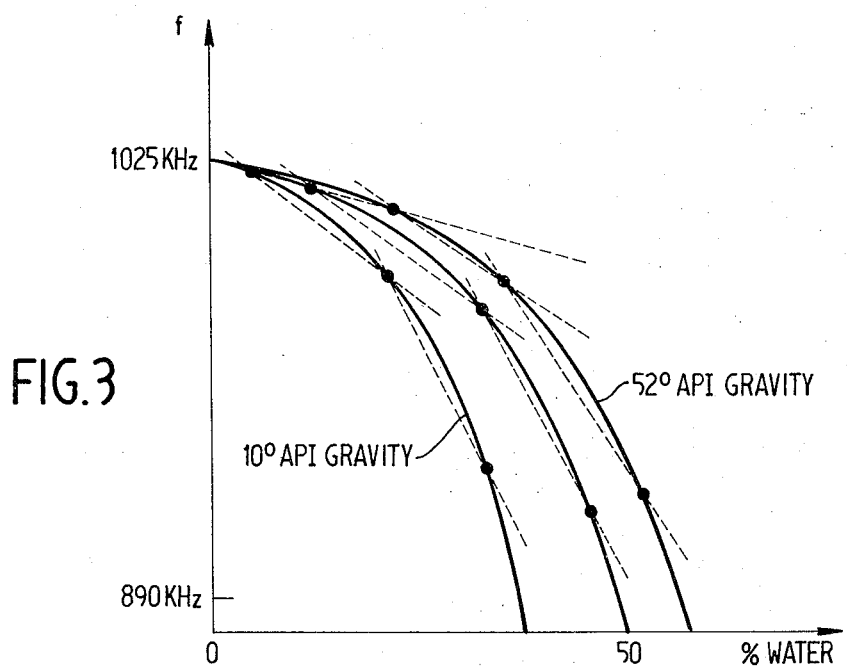

Because the slope of the frequency response curve changes continuously in the same direction as illustrated in FIG. 3, different API gravity curves may easily be selected through the selection of the breaking point potentials for the curve. Compensation may thus be effected for any one of several API gravity frequency response curves.

For example, and with continued reference to FIG. 1, the condition responsive transducer 10 may be operative to provide an output signal variable in frequency from 1,025 KHz to 750 KHz for a 0 to 100 percent water cut. The oscillator 16 may provide a signal at 2.05 MHz. The scalers 36 and 38 may reduce the input signals thereto by a factor of 64 and 128 respectively so that the output signal from the subtractor circuit 40 is variable in frequency over the range 0 to 4.28 KHz for 0 to 100 percent water cut. The pulses in the output signal from the subtractor circuit 40 may be integrated and linearized as desired to provide a unidirectional signal variable from 0 to 5 volts for 0 to 100 percent water cut. This 0 to 5 volt control signal to the monostable multivibrator 24 may be utilized to produce a gating pulse variable in duration from 0 to 100 microseconds.

The 2.05 MHz signal from the oscillator 16 is applied through the gate 26 during the time intervals in which the gate 26 is enabled by the gating pulse from the multivibrator 24 and the scaling factor of the scaler 28 selected to be 205,000.

For the example illustrated, it is important that the scaling factor of the scaler 20 be compatible with the meter factor of the flowmeter 18 so that the multivibrator 24 provides 1,000 gating intervals per barrel of fluid. With this relationship, the output signal from the scaler 28 is directly readable in barrels of net water and the net water manifestation may be directly subtracted from the output signal from the scaler 20 by the subtractor 32 to provide a net oil manifestation.

ADVANTAGES AND SCOPE OF THE INVENTION

From the foregoing, it is apparent that the present invention provides a unique method of compensating fluid flow for a variable physical condition of the fluid. A significant economy in the number of component parts and in the cost and size has been achieved by the simplicity of the circuit. The resolution of the apparatus is extremely high and linearization may be obtained for a family of API gravity curves between the response of the transducer 10 to the oil/water ratio or water cut sensed by the transducer.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for compensating a manifestation of fluid flow for a variable physical condition of the fluid comprising the steps of:
   a. providing a first signal having a frequency related to gross fluid flow;
   b. providing a second signal having a frequency related to a variable physical condition of the fluid;
   c. providing a third signal having a predetermined fixed frequency;
   d. providing a d.c. control signal in response to the second and third signals; and,
   e. gating the third signal in response to the first signal and the d.c. control signal to thereby provide an output signal related to fluid flow compensated for the variable physical condition of the fluid.

2. The method of claim 1 wherein said d.c. control signal is provided by the steps of:
   subtracting the frequency of one of said second and third signals from the frequency of the other of said second and third signals to provide a difference signal; and,
   providing a d.c. signal related in amplitude to the frequency of the difference signal.

3. The method of claim 2 wherein said one of the second and third signals is the third signal.

4. The method of claim 3 including the further step of nonlinearly modifying the frequency of the difference signal prior to providing the d.c. control signal.

5. The method of claim 4 including the further step of subtracting the frequency of one of said first and output signals from the frequency of the other of said first and output signals to thereby provide a second difference signal.

6. The method of claim 5 wherein said one of the first and output signals is the output signal.

7. The method of claim 1 including the further step of subtracting the output signal from the first signal.

8. The method of claim 7 including the further step of nonlinearly modifying the responsiveness of the d.c. control signal and the second and third signals.

9. The method of claim 1 including the further step of nonlinearly modifying the responsiveness of the d.c. control signal and the second and third signals.

10. A method for compensating a manifestation of fluid flow for a variable physical condition of the fluid comprising the steps of:
    a. providing a first series of pulses at a frequency related to gross fluid flow;
    b. providing a second series of pulses at a frequency related to a variable physical condition of the fluid;
    c. providing a third series of pulses at a predetermined fixed frequency; and,
    d. gating pulses in the third series of pulses in each of a plurality of gating intervals to thereby provide a fourth series of pulses, each of said gating intervals being initiated responsively to a pulse in the first series of pulses and being related in duration to the frequencies of the second and third series of pulses to thereby provide a manifestation of fluid flow compensated for a variable physical condition of the fluid.

11. The method of claim 10 including the step of subtracting the pulses in the fourth series of pulses from the pulses in the first series of pulses.

12. The method of claim 11 wherein the duration of each of the gating intervals is related to the difference between the frequencies of the second and third series of pulses.

13. The method of claim 12 wherein the frequencies of the second and third series of pulses are the same at the value of the variable physical condition for which no compensation is desired.

14. The method of claim 10 wherein the frequencies of the second and third series of pulses are the same at the value of the variable physical condition for which no compensation is desired.

15. A method of compensating a manifestation of fluid flow for a variable physical condition of the fluid comprising the steps of:
    a. providing a first series of pulses related in repetition rate to gross fluid flow;
    b. providing a second series of pulses at a substantially constant repetition rate;
    c. providing a third signal related to the variable physical condition of the fluid for which the manifestation of fluid flow is to be compensated; and,
    d. providing packets of pulses during a plurality of time intervals, the number of pulse packets being related to the number of pulses in the first series of pulses, the number of pulses in each packet being related to the number of pulses in the second series of pulses which occur during one of the time intervals, and the duration of each of the time intervals being related to the number of pulses in the third signal which are provided in a time interval immediately following a pulse in the first series of pulses.

16. A system for compensating a manifestation of fluid flow for a variable physical condition of the fluid comprising:
  means for providing a first signal having a frequency related to gross fluid flow;
  means for providing a second signal having a frequency related to a variable physical condition of the fluid;
  means for providing a third signal having a predetermined fixed frequency;
  means responsive to said second and third signal providing means for providing a d.c. control signal; and,
  gating means responsive to said first and control signal providing means for gating pulses from said third signal providing means to thereby provide an output signal related to fluid flow compensated for the variable physical condition of the fluid.

17. The system of claim 16 wherein said d.c. control signal providing means includes:
  means for subtracting the number of pulses provided by one of said second and third signal providing means from the number of pulses provided by the other of said second and third signal providing means to thereby provide a difference signal; and,
  means responsive to said difference signal providing means for providing said d.c. control signal.

18. The system of claim 17 wherein said one of said second and third signal providing means is said third signal providing means.

19. The system of claim 18 including means for nonlinearly modifying the frequency of the difference signal from said difference signal providing means.

20. The system of claim 19 including means for subtracting the number of pulses provided by one of said first and output signal providing means from the number of pulses provided by the other of said first and output signal providing means to thereby provide a second output signal.

21. The system of claim 20 wherein said one of said first and output signal providing means is said output signal providing means.

22. The system of claim 16 including means for subtracting the number of pulses in said output signal from the number of pulses in said first signal.

23. The system of claim 22 including means for nonlinearly modifying the relationship of said d.c. control signal providing means to said second and third signal providing means.

24. The system of claim 16 including means for nonlinearly modifying the relationship of said d.c. control signal providing means to said second and third signal providing means.

25. A system for compensating a manifestation of fluid flow for a variable physical condition of the fluid comprising:
  means for providing a first series of pulses at a frequency related to gross fluid flow;
  means for providing a second series of pulses at a frequency related to a variable physical condition of the fluid;
  means for providing a third series of pulses at a predetermined fixed frequency; and,
  means for gating pulses in the third series of pulses in each of a plurality of gating intervals to thereby provide a fourth series of pulses, said gating in each being responsive to said first series of pulses providing means to initiate each of said gating intervals, said gating means being responsive to said second and third series of pulses providing means in controlling the duration of each of said gating intervals to thereby provide a manifestation of fluid flow compensated for a variable physical condition of the fluid.

26. The system of claim 25 including means for subtracting the pulses provided by said fourth series of pulses providing means from the pulses provided by said first series of pulses providing means.

27. The system of claim 26 wherein the frequencies of the second and third series of pulses are the same at the value of the variable physical condition for which no compensation is desired.

28. The system of claim 25 wherein the frequencies of the second and third series of pulses are the same at the value of the variable physical condition for which no compensation is desired.

* * * * *